US 6,607,326 B1

(12) United States Patent
Christiansen

(10) Patent No.: US 6,607,326 B1
(45) Date of Patent: Aug. 19, 2003

(54) PLANETARY SPHERE/RING GEAR

(76) Inventor: Lyle J. Christiansen, 701 Imperial Dr., Morris, MN (US) 56267

( * ) Notice: Subject to any disclaimer, the term of this patent is extended or adjusted under 35 U.S.C. 154(b) by 0 days.

(21) Appl. No.: 10/139,791

(22) Filed: May 7, 2002

(51) Int. Cl.[7] ................................................ G05G 1/16
(52) U.S. Cl. .................... 403/24; 403/122; 74/594.1; 74/594.2; 74/594.3
(58) Field of Search ................... 403/122, 128, 403/131, 130, 135, 127, 24; 74/594.1, 594.2, 594.3

(56) References Cited

U.S. PATENT DOCUMENTS

| | | | |
|---|---|---|---|
| 883,018 A | | 3/1908 | Henry |
| 2,662,557 A | * | 12/1953 | Heim ...................... 403/131 X |
| 3,653,228 A | * | 4/1972 | Tiberio .......................... 464/24 |
| 4,816,009 A | * | 3/1989 | Philipp .................. 74/594.1 X |
| 5,056,951 A | * | 10/1991 | Mariani .................. 403/131 X |
| 5,178,088 A | | 1/1993 | Howard |
| 5,361,649 A | * | 11/1994 | Slocum, Jr. ................ 74/594.2 |
| 5,845,593 A | | 12/1998 | Birkestrand |
| 6,474,193 B1 | * | 11/2002 | Farney ...................... 74/594.3 |

* cited by examiner

*Primary Examiner*—Lynne H. Browne
*Assistant Examiner*—John R. Cottingham

(57) ABSTRACT

A planetary sphere/ring gear, comprising a sphere and a ring, which are interconnected by a ball and a socket. The ball is located on the edge of a circular opening in the ring and the socket is located on the body of the sphere. Used in conjunction with this planetary sphere/ring gear is a pedal-powered three or more wheeled vehicle which comprises a chain wheel, and pedals which swivel and which swing on a cradle. An operator's seat also swings on said cradle. Even though traversing across slopes, the chain wheel, pedals and seat are in a straight-with-the-world position, which is a natural and comfortable position for pedaling. The planetary sphere/ring gear is needed in the vehicle to allow the toothed ring, with a drive chain around it, to change its axis to line up with the drive wheel, as it swivels and swings.

1 Claim, 1 Drawing Sheet

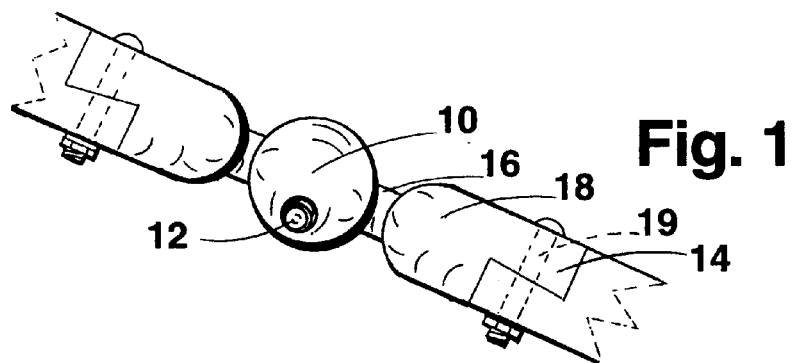
Fig. 1
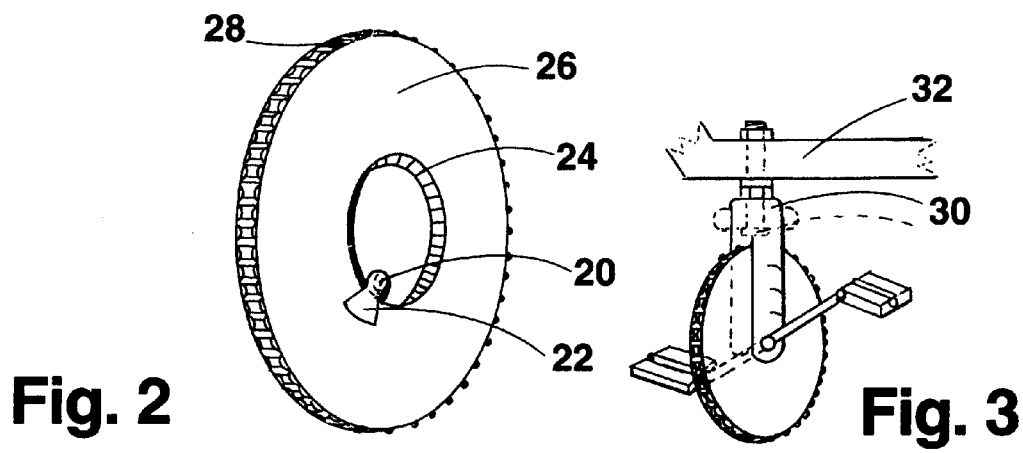
Fig. 2
Fig. 3
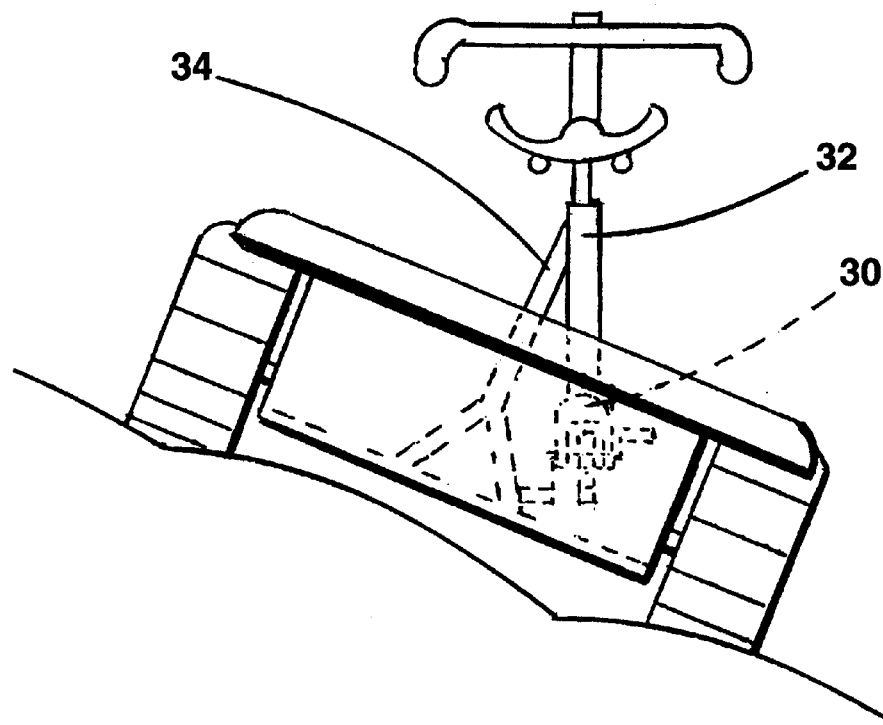
Fig. 4

PLANETARY SPHERE/RING GEAR

CROSS-REFERENCE TO RELATED APPLICATIONS

Not applicable

BACKGROUND—FIELD OF INVENTION

This invention relates to planetary sphere/ring gears, specifically to such gears located at mid-point of a vehicle's axle and for use in conjunction with a swiveling and swinging chain wheel with pedals, and drive chain for use in pedal-powered vehicles that have three or more wheels.

BACKGROUND—DESCRIPTION OF PRIOR ART

When one rides a two-wheeled bicycle across a slope, the rider leans the bicycle and his body into a gravitational, upright position. This is a comfortable pedaling position as the body and bicycle are in line. But when one pedals a three, four, or more wheeled vehicle across a slope, one finds that as the vehicle tips, with some of its wheels higher up the slope and some of its wheels remaining lower on the slope, the rider must lean one way or the other on the fixed stand with its pedals in order to stay straight with the world. This is very awkward and uncomfortable while pedaling because the pedals' drive wheel and operator's seat are at a different angle than the upright operator. Some inventors have proposed pedal-powered vehicles with three or four wheels. They are: J. L. Henry, U.S. Pat. No. 883,019 (1907), Howard, U.S. Pat. No. 5,178,088 (1991) and Birkestrand, U.S. Pat. No. 5,845,593 (1996) but none of these have a pedal-powered system which allows its operator to pedal the vehicle while in a gravitational, comfortable, upright position when traversing across slopes.

Applicant's current invention accomplishes this with its planetary sphere/ring gear, which is installed at mid-point of the vehicle's axle. The said sphere/ring gear comprises a ball and socket type of gear; and, in conjunction with its swinging and swiveling chain wheel it has a drive chain that interconnects a toothed ring on an axle and a chain wheel.

OBJECTS AND ADVANTAGES

Accordingly, besides the objects and advantages of a planetary sphere/ring gear described above, other objects and advantages of the present invention are:

(a) to provide a planetary sphere/ring gear that is simple in construction; and (b) to provide a planetary sphere/ring gear which is located in the middle of a three or more wheeled pedal-powered vehicle's front or rear axle and when used in conjunction with a swinging and swiveling chain wheel and said sphere/ring gear and said chain wheel are interconnected by a drive chain, results in the drive wheel with pedals and the operator's seat to be in an upright position when traversing across slopes. No leaning by the operator makes for natural and comfortable pedaling. The chain wheel, pedals, and operator's seat all hang from a cradle and then gravity keeps them always in a straight-with-the-world position.

Still further objects and advantages will become apparent from a consideration of the ensuing description and drawings.

DRAWING FIGURES

FIG. 1 shows a planetary sphere, necks, and axle segments located at mid-point of an axle of a vehicle. And shows a ball-shaped socket on the body of the sphere.

FIG. 2 shows a planetary ring with a ball-shaped projection located on the edge of the ring's circular opening and showing a flared tail on the ball-shaped projection, which extends into the body of said planetary ring.

FIG. 3 shows a chain wheel and its swivel and its location on a swinging cradle.

FIG. 4 shows a vehicle traversing across a slope and showing a chain wheel and operator's seat hanging in a gravitational, upright position.

REFERENCE NUMERALS IN DRAWINGS

| | |
|---|---|
| 10 planetary sphere | 24 circular opening |
| 12 ball-shaped socket | 26 planetary ring |
| 14 joint in axle | 28 teeth |
| 16 neck | 30 swiveling chain wheel |
| 18 half-sphere shaped segment | 32 swinging cradle |
| 20 ball-shaped projection | 34 fixed upright support |
| 22 tail | |

SUMMARY

In accordance with the present invention, a ball and socket interconnect a planetary sphere/ring gear comprising a sphere and a ring. The ball is located on the edge of a circular opening in the ring and the socket is located on the body of the sphere.

DESCRIPTION—FIGS. 1–4—PREFERRED EMBODIMENT

A preferred embodiment of a planetary sphere and adjacent necks and segments of axle are illustrated in FIG. 1 (front view). The sphere 10 comprises a ball-shaped socket 12, which is located on the longitudinal mid-point between two necks 16 which are adjacent to opposite sides of the sphere. Segments of the axle 18 are adjacent to the other ends of the necks. The axle segments, which are adjacent to the necks, have half-sphere shaped ends. The axle segments' other ends comprise joints 14 that interconnect with the rest of the axle which comprise the other half of the joints. The joints comprise a bolt, a lock washer, and a nut 19, which serve to hold the joints and axles rigidly together. A ball-shaped projection 20 FIG. 2 is located on the edge of a circular opening 24 and said opening is a size just slightly larger than the sphere's diameter. A flared-shaped tail 22 is located on one end of the ring's ball-shaped projection 20 and said tall projects into the body of the planetary ring 26. Teeth 28 which accept a drive chain (not pictured) are located on a swinging cradle 32, which swings from a fixed upright support 34 (FIG. 4).

Advantages

From the description above, a number of advantages of a planetary sphere/ring gear become evident:

(a) A pedal-powered, three or more wheeled vehicle equipped with this gear comprises a chain wheel, pedals, and operators seat all which swing into an upright position when one pedals across slopes. This results in natural and comfortable pedaling for the operator.

(b) This gear is easy to manufacture using strong steel.

Operation—FIGS. 1–4

A scenario below:

A planetary sphere 10, necks 16, and axle segments 18 await assembly to a planetary toothed ring 26, then:

(a) The ring comprising a circular opening 24 is slipped over said axle segment and neck and then onto said sphere.

(b) A ball-shaped projection 20 and its tail 22 is grasped and the ball-shaped projection is placed into a ball-shaped socket 12 located on the body of the sphere.

(c) Said tail's cavity located in the ring's body is slipped onto the tail.

(d) The vehicle's drive chain is then slipped around the teeth 28 which encircle the planetary ring.

(e) The sphere/ring unit is then placed between the outer sections of the axle and then fixed in place with the insertion of a bolt 19 through joints 14 which connect the gear unit and the segments of the axle.

In conjunction with a planetary sphere/ring gear a three or more wheeled, pedal-powered vehicle comprises a swiveling chain wheel 30, which hangs from a swinging cradle 32 that swings from a fixed upright support 34.

If one is pedaling a vehicle equipped with a planetary sphere/ring gear and is traversing across a slope, this is how the invention works. Power from the revolving pedals is transferred to the sphere/ring gear. The body of the vehicle slants as it follows the contour of the slope. The swiveling chain wheel and driver's seat swings into a gravitational upright position via the swinging cradle. The drive chain then is in an upright position also. The upright drive chain then puts force onto the sphere/ring gear to move it also into an upright position. The ring moves around the sphere as it's ball-shaped projection rotates within the sphere's ball-shaped socket. The chain wheel in its swinging cradle turns on its swivel in order to directly point towards the sphere/ring gear also. This pointing at the sphere/ring gear insures that the drive chain is always the same distance from the sphere/ring gear and therefore needs no tension adjustment as the angle of a traversed slope changes. An independent tension adjustment would be helpful when removing or installing a chain and also in choosing the correct chain tension.

Conclusion, Ramifications, and Scope

Accordingly, the reader will see that a planetary sphere/ring gear, when included in the construction of a three or more wheeled pedal-powered type vehicle and in conjunction with a swiveling and swinging chain wheel, pedals, and operator's seat permits an operator to traverse across slopes while pedaling in an upright comfortable position.

There is no leaning by the operator on the seat to compensate for the slanting of the vehicle traversing across a slope and no awkward angle of the drive wheel and pedals as they tilt with the slanting vehicle while the operator strives to pedal in an erect position, as was formerly the case.

The planetary sphere, necks, and axle assembly could be varied in construction. For example, the sphere would comprise a cavity on its opposing sides. Said cavity would be of a shape to accept the ends of the axle's smaller diameter sections describe below. The sphere would be attached to the necks by a smaller diameter section located on the ends of the larger diameter axle. The ends of said smaller diameter section would have a rounded flare on two sides and flat sides on the other two sides, so the very end of this section would be square to prevent the sphere and axles from turning within each other. The rounded flare would match up with the spheres' contours and flush with them. This sphere would also comprise a ball-shaped socket located on the longitudinal middle between the necks. The ball-shaped projection on the planetary ring would have a threaded cavity in the edge of the ring's circular opening. The section on the ring, where the threaded cavity is located, would be made thicker to accommodate the cavity located in that section.

Although the description above contains many specifics, these should not be construed as limiting the scope of the invention but as merely providing illustrations of some of the presently preferred embodiments of this invention. For example, the materials used for the construction and the methods used can be varied.

Thus the scope of the invention should be determined by the appended claims and their legal equivalents, rather than by the examples given.

I claim:

1. A planetary sphere and ring gear comprising:

a sphere comprising:
  (a) a neck located on opposite sides of said sphere and,
  (b) a ball-shaped socket in said sphere and located on the longitudinal midpoint between said necks and,
  (c) short segments of an axle that are half-sphere shaped on their ends and which are located on the other ends of said necks and,
  (d) joints located on the other ends of the short segments of the axle which interconnect with the main segment of the axle and which said main segments comprise complementary joint ends;

a ring comprising:
  (a) a circular opening which is slightly larger than the sphere's diameter and,
  (b) a flared-shaped notch located in the body of the ring and on the edge of said circular opening, and,
  (c) a ball-shaped projection with a flared-shaped tail and wherein said flared-shaped tail interconnects with said flared-shaped notch, wherein said ball-shaped projection is inserted into said ball-shaped socket of the sphere.

\* \* \* \* \*